United States Patent [19]
Varos

[11] Patent Number: 5,313,194

[45] Date of Patent: May 17, 1994

[54] RUPTURE DISK SENSING ASSEMBLY

[76] Inventor: Richard V. Varos, 820 Coy La., Chagrin Falls, Ohio 44022

[21] Appl. No.: 868,450

[22] Filed: Apr. 14, 1992

[51] Int. Cl.⁵ .................. G08B 21/00; F16K 17/14; H01H 85/00
[52] U.S. Cl. .................. 340/626; 137/68.1; 137/557; 200/61.08
[58] Field of Search .......... 340/626, 611, 652; 200/61.08; 361/1, 116; 116/266, 268; 220/89.1–89.4; 137/557, 67, 68.1, 68.2, 71; 73/37, 49.5, 862.581, 862.582, 862.583, 715, 723

[56] References Cited

U.S. PATENT DOCUMENTS

| | | | |
|---|---|---|---|
| 3,770,918 | 11/1973 | Fortmann | 200/61.08 |
| 3,936,621 | 2/1976 | Palin et al. | 200/61.08 |
| 4,270,560 | 6/1981 | Kearney | 137/68.1 |
| 4,408,194 | 10/1983 | Thompson | 340/626 |
| 4,978,947 | 12/1990 | Finnegan | 340/611 |
| 5,155,471 | 10/1992 | Ellis et al. | 340/611 |

OTHER PUBLICATIONS

Sigri brochure, "Sigri Combats Corrosion", p. 18, Jul. 1987.
Kearney Industries catalog excerpt "Kelonite Graphite Burst Discs".
Carbone, "Bonite Impervious Graphite Rupture Disks:, catalog excerpt".
Elfab-Hughes, catalog excerpt Oseco, "Burst Disk Alarm System".
Carborundum, "Falls Impervite Impervious Graphite Rapture Disks", catalog excerpt.
"B.D.I. Alarm System For Rupture Discs", catalog excerpt of the Continental Disc Corporation, Mar. 1983.
"Special Grafsert With Burst Disc Indicator (BDI) Installation Instructions.", Continental Disc Corporation.

Primary Examiner—Thomas Mullen
Attorney, Agent, or Firm—Watts Hoffmann Fisher & Heinke

[57] ABSTRACT

An integral burst sensing disk assembly wherein a disk forms an integral part of the burst sensing circuit. The improvement of the instant invention comprises using a rupture disk to form a complete circuit between a wire connected to the burst membrane portion of the disk, through the disk to another wire connected to the outer surface of the disk. When the disk bursts to relieve an over-pressure situation, the circuit is broken and a signal sent to indicate that the disk has burst.

17 Claims, 5 Drawing Sheets

RUPTURE DISK SENSING ASSEMBLY

FIELD OF THE INVENTION

This invention relates to rupture disks that obturate a relief port in a fluid system, and more particularly to an assembly for sensing when a rupture disk bursts.

BACKGROUND OF THE INVENTION

Rupture disks are commonly used in industry as safety devices. In order to indicate that a closed system has been relieved of an over-pressure condition the rupture disks can operate in conjunction with sensing devices. Whether the fluid system is a positive or negative pressure system, the disks function to relieve pressure by bursting when a designated pressure (or vacuum) is reached. The rupture disk can be connected to a sensor and signaling device, which alerts operators that the disk has burst. Disks and sensors vary in design and in the materials used, but typically have an outer annular mounting portion surrounding an inner, pressure-sensitive membrane portion that blocks a flow of fluid in a relief port. The typical sensor and signaling device operating in conjunction with the disk is triggered when the disk bursts and breaks an electrical circuit, creating a signal at, e.g., a monitoring station.

SUMMARY OF THE INVENTION

The instant invention provides an advantageous and improved integral rupture disk and sensor assembly. By integrating the sensor and disk into a single factory assembled unit, high quality performance can be assured by factory testing prior to shipment to a customer. This simplifies installation procedures and thus reduces risk of error and damage during installation. When the disk leaves the factory it is ready for immediate and uncomplicated installation between standard pipe flanges. The disk assembly is highly tamper-proof and significantly reduces the possibility of failed signals due to accidental maintenance of a closed circuit after burst.

To achieve the advantages of the instant invention there is provided an integral rupture disk and sensor assembly comprising a rupture disk that is made of a conductive material, preferably graphite, which has a fragmenting pressure sensitive membrane portion and an outer circumferential surface, a first conductor secured to the pressure sensitive membrane portion and a second conductor secured to the outer circumferential surface. The conductors are adapted to form a complete circuit through the disk, i.e., the rupture disk itself is part of a complete circuit, such that when the pressure sensitive portion fragments or bursts, the circuit is broken. The breaking of the circuit thereby causes a signal to be transmitted to an alarm or warning system indicating that the disk has burst.

A preferred embodiment of the invention utilizes an outer annular support portion that is substantially thicker than and integrated with the central pressure sensitive membrane portion. In the preferred construction, the membrane portion is flush with one radial end surface of the outer circumferential portion. An insulating coating is provided on all surfaces of the disk with which the first conductor, which is preferably a wire, is likely to come in contact after the disk has burst. Teflon ® is the preferred coating although other coatings that will prevent the closing of the circuit due to inadvertent contact of the first wire with a surface of the disk after burst can be used. A preferred embodiment also utilizes an outer casing, preferably a metal casing such as steel, disposed about the outer circumferential surface of the disk to add support, strength and durability to the disk structure.

The present invention provides a rupture disk that is easy to install. To this end, terminal portions of the two conductors are received in a junction housing secured to the outer circumferential surface of the disk. The housing is preferably no thicker than the disk itself so that it will not interfere with standard pipe flanges between which the disk is typically mounted. In the preferred embodiment, the conductors, which are wires, converge in a two wire cable that extends from the junction housing and terminates at an end adapted to be connected into a warning system.

In a preferred embodiment, two face-to-face annular gaskets are located at the end surface on the vent side of the disk. A single annular gasket is located at the opposite end surface. The conductor that is secured to the pressure sensitive portion of the disk in this embodiment travels from the outer periphery of the rupture disk e.g. from the junction box, between the two gaskets at the vent side of the disk and is secured to the pressure sensitive membrane portion of the disk. The two gaskets between which the conductor extends assure a well-sealed system when the disk and gaskets are clamped between opposing pipe flanges.

It is necessary that at least the first conductor, which is preferably a wire, be physically secured to the pressure sensitive portion, rather than simply in contact with it. This permits the manufacturer to directly assure that the conductor makes electrical contact with the membrane portion, allows pre-testing of the unit in the same condition in which it will be installed, and ensures continued integrity of the contact by isolating it from foreign material or lack of contact through distortion of the wire, improper installation of the unit, vibration and the like. In the preferred embodiment, electrically conductive cement is used for securing the wire to the pressure sensitive membrane portion.

These and other features and advantages of the instant invention will become more apparent from the following detailed description.

DETAILED DESCRIPTION OF THE INVENTION

Figure 1:
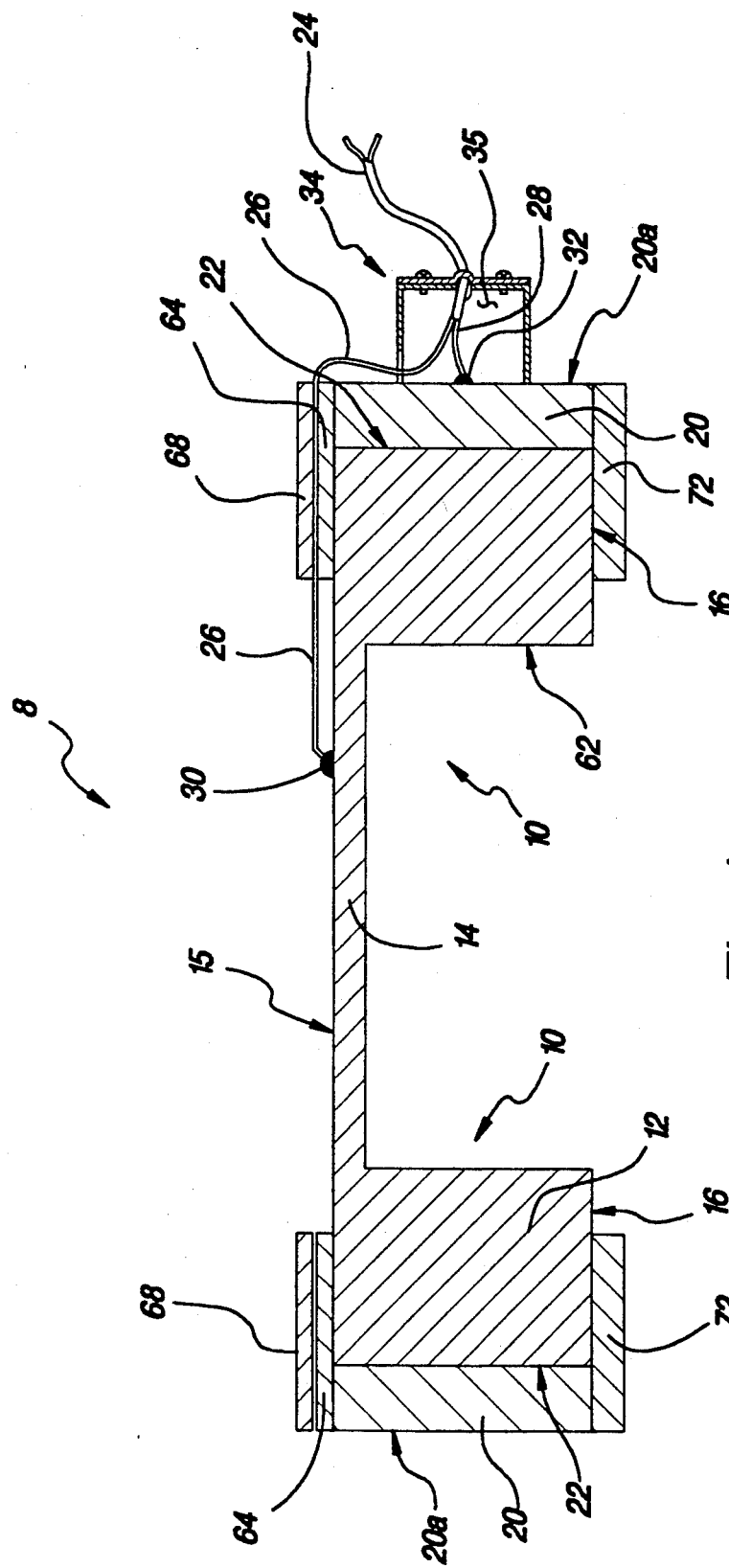
FIG. 1 is a diagrammatic cross section of a Mono Style disk assembly of the invention.

The preferred embodiment of the invention is shown in the drawings. It comprises an assembly 8 of an electrically conductive rupture disk 10 and integral outer casing 20, first and second electrically conductive wires 26, 28 for conducting current through the disk, a junction housing 34 from which the wires extend for connection to a signal circuit, and gaskets 64, 68, 72.

A rupture disk 10 of the invention comprises an annular support portion 12 and a pressure sensitive membrane portion 14. The annular support portion of the disk forms an annular base that is thicker in the axial direction than the pressure sensitive membrane portion of the disk. The pressure sensitive membrane portion 14 is integral with the annular support portion 12. The outer surface of the pressure sensitive membrane portion is integral and flush with one end surface of the annular support portion. This end surface, including the outer surface of the membrane portion, will be referred to as the membrane surface 15 in FIG. 1 and FIG. 1a. The opposite end of the disk forms an annular surface 16 about a cylindrical recess of a diameter equal to the diameter of the pressure sensitive membrane portion. The disk 10 is thus a cylinder and the pressure sensitive membrane portion in part forms a radial end face of the cylinder that is thinner in the axial direction than the rest of the cylinder.

To add strength, support and durability to the disk, an outer casing 20, typically a metal casing, closely surrounds the outer circumferential surface 22 of the annular support portion 12 of the disk in an electrically conductive and structurally supportive relationship. The casing is a cylinder integral with and of substantially the same axial dimension as the disk 10.

Figure 4:
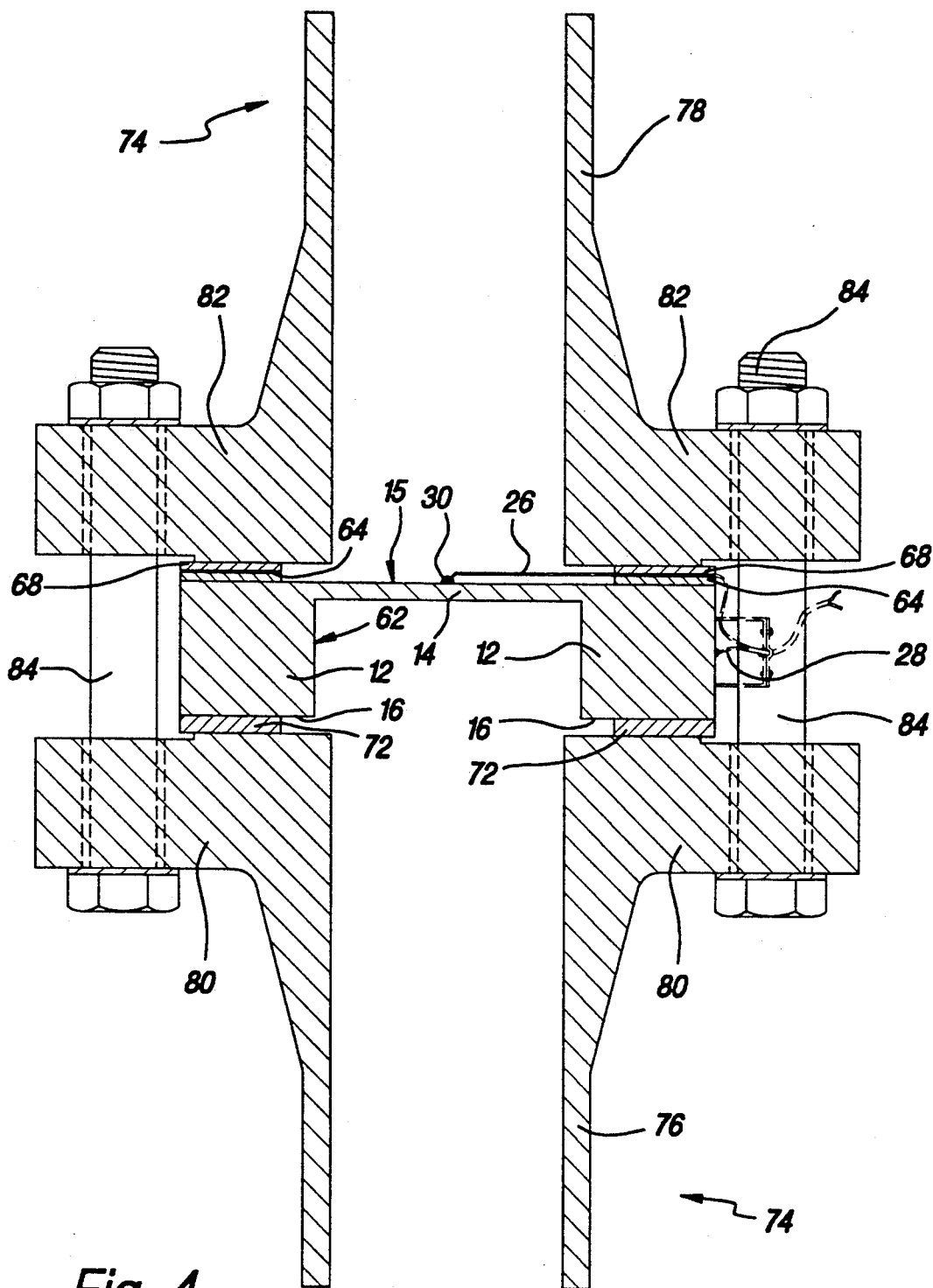
FIG. 4 is a diagrammatic cross section of the disk of FIG. 1 in a typical installation.

First and second insulated wires 26, 28 from a single two wire cable 24 are in electrically conductive contact with the disk 10. The first wire 26 is secured in a conductive relationship to the pressure sensitive membrane portion 14 of the disk. This wire is secured to the membrane portion with electrically conductive cement 30 on the membrane surface 15, 15a. The second wire 28 is secured in an electrically conductive relationship to the outer circumferential surface 20a of the metal casing by a suitable fastener; in the preferred embodiment shown, by a drive-screw 32, which also serves to secure a side of a junction housing 34. When the preferred outer casing 20 is not employed, the second wire 28 is secured to the outer circumferential surface 22 of the support portion 12 as seen in FIG. 4.

Figure 1A:
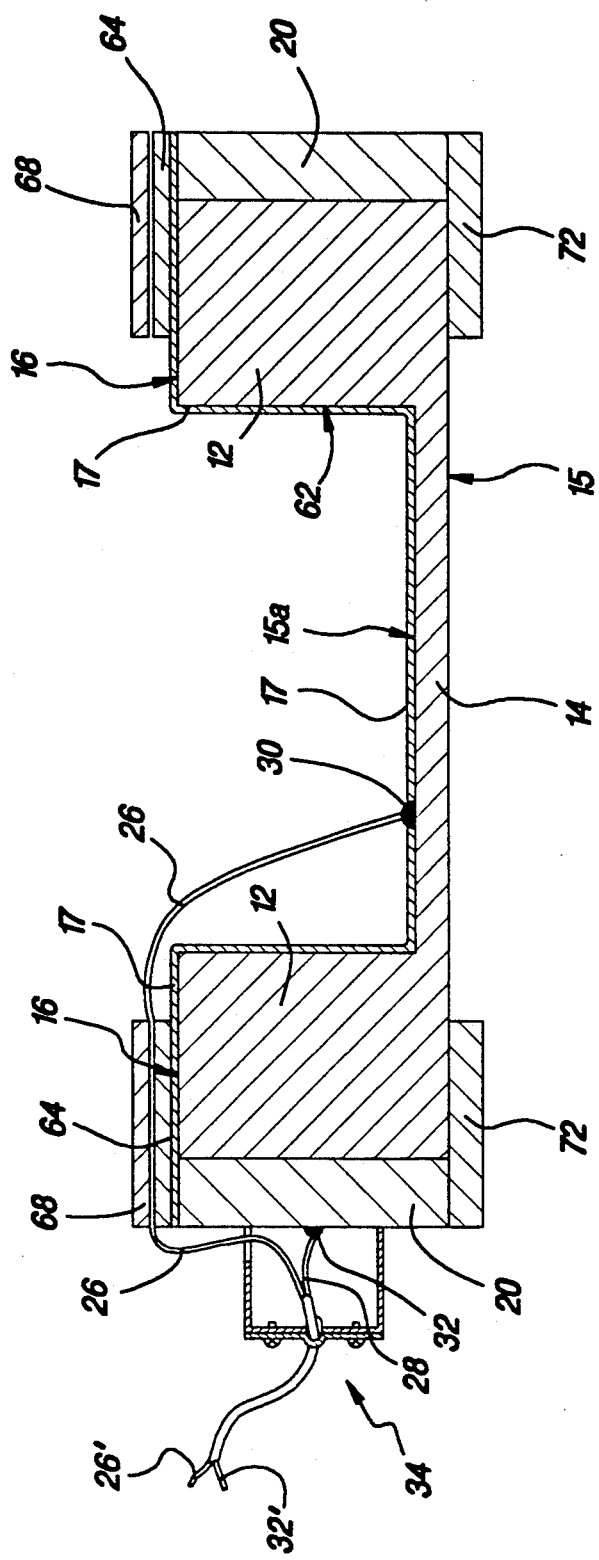
FIG. 1a is a diagrammatic cross section of an Inverted Style disk assembly of the invention.
Figure 2:
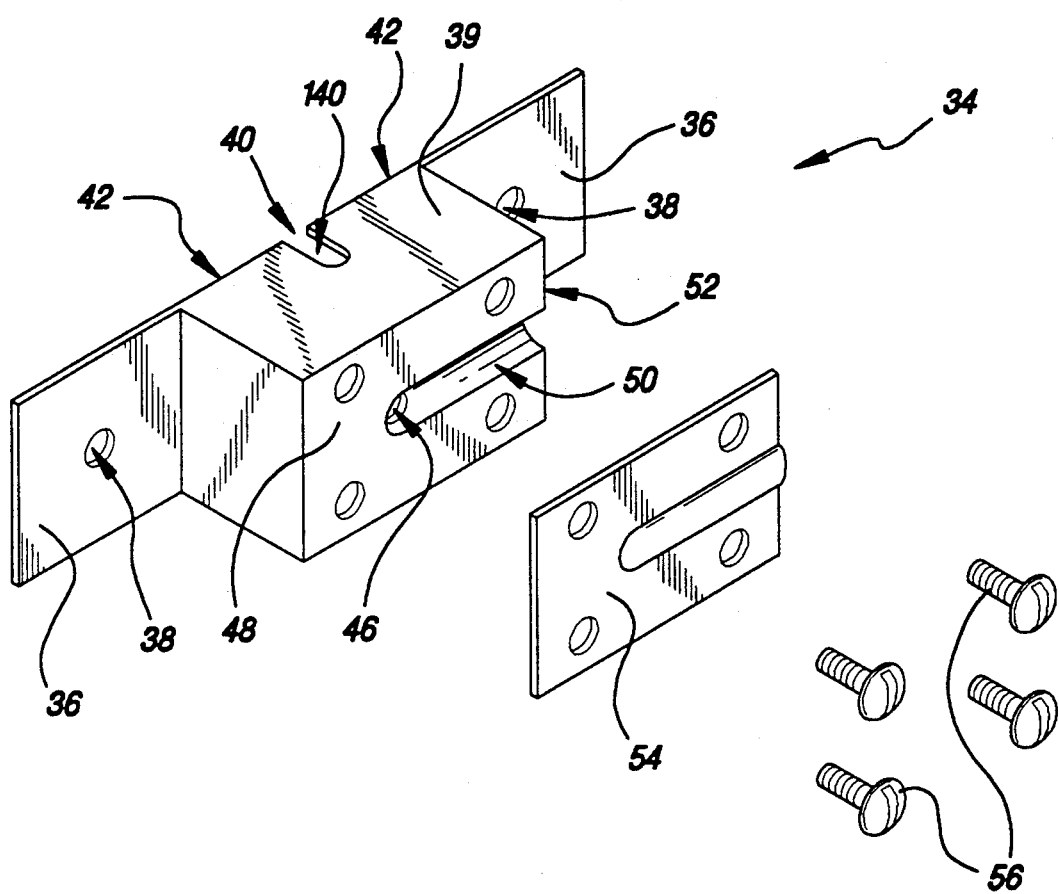
FIG. 2 is a diagrammatic exploded view of the junction housing.

A junction housing 34, seen best in FIG. 2, is secured to the outer circumferential surface 20a of the metal casing portion 20 of the disk 10 for receiving a portion of the first and second wires that extends from the incoming end of the cable 24. The junction housing is a substantially square or rectangular box that has lateral side flanges 36 with holes 38 disposed therein for mounting the housing to the disk. The housing is formed of folded sheet metal, such as stainless steel. When mounted to the outer circumferential surface 20a the housing is no thicker than the axial dimension of the disk. As shown, the junction housing is slightly thinner in the axial direction than the disk. A notch 40 is disposed in the surface 39 of the housing that is parallel and proximal to the membrane surface 15 in FIG. 1 or, in the case of the Inverted Style, the annular surface 16 in FIG. 1a. The notch is disposed in the edge 42 of the surface 39 that abuts against the outer circumferential surface 20a when the housing is mounted. The notch provides a void 140 between the outer circumferential surface of the metal casing and the housing through which the first wire 26 can pass en route to the membrane surface 15, 15a. The junction housing cavity is filled with a silicon compound 35 in FIG. 1.

The first and second wires 26, 28 enter the junction housing through an opening 46 in the surface 48 of the housing 34 that is parallel to the outer circumferential surface 20a of the casing. The incoming two wire cable 24 communicates with the junction housing at said opening. The surface 48 has a lateral groove 50 disposed therein which runs from the edge 52 of the surface 48 to about the center thereof where it terminates at the opening 46. The lateral groove serves to receive the incoming two wire cable so that the first and second wires enter the housing through the opening 46. When the incoming cable is disposed along the groove so that the end having the first and second wires extending therefrom is located at the opening 46, a face plate 54 is placed over the cable and secured to the surface 48. As shown, the face plate is secured with four face plate screws 56. Inside the junction housing the first wire travels out of the junction housing through the void 140 formed by notch 40, and the second wire is secured to the outer circumferential surface 20a. As shown, the second wire is secured to the outer circumferential surface by the fastener 32 that attaches a side flange 36 of the housing. As noted above, the first wire is secured to the membrane surface 15, 15a by electrically conductive cement 30. The cable 24 extends a short distance away from the housing and terminates at a distal end shown in FIG. 1a as wires 26' and 32', to which a suitable mechanical and electrical connector can be attached that is compatible with a signal or warning system to which it is to be connected, shown conceptually in FIG. 3.

Since the rupture disk is electrically conductive, when the first and second wires at the distal end of the cable are connected in a conductive relationship to an electrical warning system, current is able to pass from the system through one of the wires, through the disk itself, to the other of said wires and back to the system, thus forming a complete circuit with the system. In normal use, when the pressure sensitive membrane portion of the disk bursts, the flow of current from one of said wires, through the disk, to the other of said wires is interrupted because the first wire and pressure sensitive membrane portion of the disk are no longer in electrical contact with the periphery of the disk. The disk itself no longer forms a part of the circuit through which electricity can flow.

To ensure that the circuit remains broken when the pressure sensitive membrane portion bursts, surfaces of the burst disk with which the first wire might come in contact are coated with an insulating coating 17 applied on the inner circumferential surface 62 of the annular support portion, the membrane surface 15, 15a and the annular surface 16 of the disk. Thus, incidental contact of the first wire with one of these surfaces will not close the circuit after burst.

The rupture disk assembly includes gaskets for when the burst disk is installed in its environment of use, i.e., between pipe flanges. On the membrane-surface 15, 15a of the disk, first and second vent side gaskets 64, 68 are provided as part of the rupture disk assembly. The first and second vent side gaskets are substantially identical in dimension and are substantially the same outer diameter as the disk and metal casing. Each of the vent side gaskets has a pressure sensitive adhesive 18 on one surface so that they can be firmly secured to the membrane surface 15 or, in the case of the Inverted Style assembly, the annular surface 16 of the annular support portion 12 and 20 of the disk. When assembling the rupture disk assembly, the first vent side gasket 64 is secured by the pressure sensitive adhesive directly to the membrane surface of the support portion 12 and 20 of the disk. The first wire is then extended from the junction housing through the void 140 across the first vent side gasket to the pressure sensitive membrane portion where it is secured by the electrically conductive cement 30. The second membrane surface gasket is then placed on top of the first gasket and the first wire, and held in place by the pressure sensitive adhesive.

At the opposite end of the disk a single annular pressure side gasket 72 is secured to the annular surface 16 in FIG. 1 or the membrane surface 15 in FIG. 1a of the annular support portion of the disk by a pressure sensitive adhesive disposed on a surface of the gasket. This gasket also has a diameter substantially equal to the diameter of the disk and metal casing but has an axial thickness substantially equal to the combined axial thickness of the vent side gaskets.

The rupture disk is designed to be installed in conventional pressure or vacuum relief conduits of pressurized fluid systems. By way of example in FIG. 4, a multi-part vent pipe assembly 74 is shown. Two sections of the vent pipe 76, 78 have adjacent facing pipe flanges 80, 82 spaced to receive the rupture disk and gaskets. The pipe flanges are spaced apart so that the rupture disk and gaskets can be held therebetween. The first section of vent pipe 76 constitutes a portion of the pressurized/vacuumed system whereas the second part of the vent pipe 78 constitutes a relief conduit leading to the open atmosphere or to a safety overflow system.

The rupture disk is factory assembled prior to installation. When received by a customer for installation, the rupture disk assembly comprises the disk and casing, with the junction housing, wires and gaskets secured thereto. To install the Mono style rupture disk assembly shown in FIG. 4, it is placed between the pipe flanges. The annular surface 16 with the annular surface gasket 72 attached thereto is placed against the pipe flange 80 of the first vent pipe section 76 so that the annular support portion of the membrane surface will be secured against the pipe flange 82 of the second vent pipe portion 78. Thus, when properly installed, the annular support portion of the annular surface, with the gasket attached thereto, will be secured against the flange of the pressurized/vacuumed portion of the system, and the annular support portion of the membrane surface with its gaskets will be secured against the flange of the relief conduit portion of the vent pipe. When in place, the flanges of the pipes are tightened toward each other by bolts 84, thereby sandwiching the disk and gaskets between them in a fluid-tight relationship. Since the Inverted Style is also factory assembled, it is easily installed by reversing the gaskets as seen in FIG. 1a.

Figure 3:
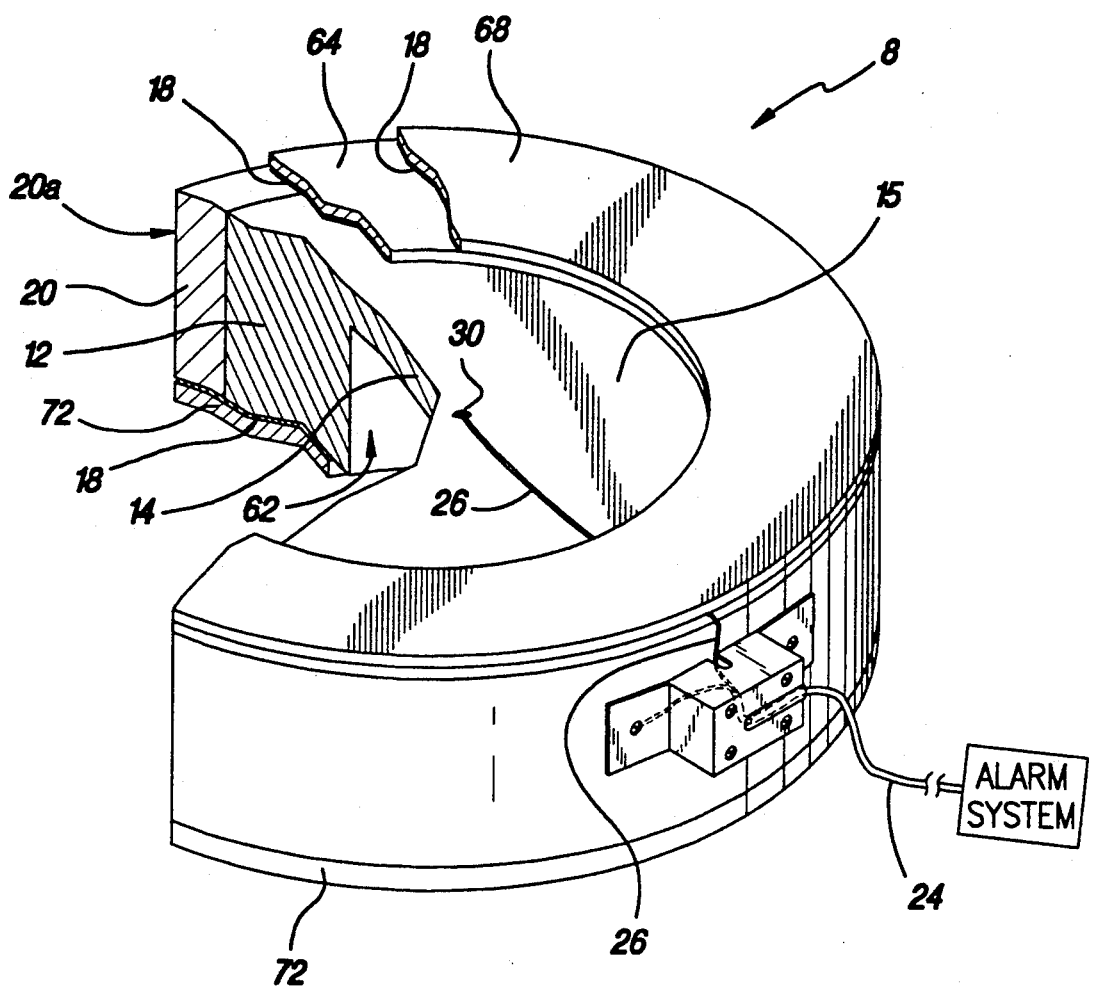
FIG. 3 is a partial cross-sectional schematic of a disk embodying the invention.

As seen in FIG. 3, the rupture disk assembly forms a single layer, relatively thin assembly, when installed. If the pressure (or vacuum) in the first part of the vent pipe exceeds the level that the system is designed for, and thus that the rupture disk is rated for, the pressure sensitive membrane portion 14 will burst (or implode in the case of vacuum), thereby breaking the circuit between the first wire, through the disk to the second wire. The breaking of the circuit triggers an indicating means for indicating that the disk has burst.

By way of example, a nominal 10.16 cm (4") graphite rupture disk assembly rated to burst at a pressure of 2.76 bar g (40 psig) was prepared. The outside diameter of the graphite disk was 14.61 cm (5.75"). Surrounding the outer circumferential surface of the graphite disk was a steel casing having a diameter of 17.15 cm (6.75"). The steel casing was secured to the graphite disk by carbonaceous cement formed of a conductive carbonaceous powder, such as Carbo-Alkor powder, mixed with a phenolic or epoxy resin binder. The pressure sensitive membrane portion of this disk had an axial thickness of approximately 0.44 cm (0.17") and a diameter of 10.2 cm (4.0"). The annular support portion had an axial thickness of approximately 2.2 cm (0.875").

The gaskets were made of a non-asbestos material and had a pressure sensitive adhesive on one side. The outer diameter of each gasket was substantially identical and approximately 17.1 cm (6.75"). The annular surface gaskets had an axial thickness of about 0.3 cm (0.12") while the membrane surface gaskets each had an axial thickness of about 0.15 cm (0.06").

The junction housing was made of stainless steel and secured to the outer circumferential surface of the disk with drive-screws. The total lateral length of the housing, including the mounting flanges, was about 6.03 cm (2.37"). The housing portion itself had a lateral length of about 2.8 cm (1.1") and an axial width of about 1.8 cm (0.71"). The housing protrudes out and away from the outer circumferential surface of the disk about 1.3 cm (0.51"). A cable containing two tantalum wires was used as the cable for connecting the rupture disk to the warning system.

This particular assembly was for installation between standard 4" size ANSI pipe flanges and was designed to burst at 2.76 bars g (40 psig)

While the preferred embodiment of the invention has been described in some detail, modifications and equivalents would be known to one of ordinary skill in the art. It is intended that this disclosure be construed to include such modifications and equivalents that are within the scope and spirit of this invention set forth in the appended claims.

What is claimed is:

1. An integral rupture disk and sensor assembly comprising:
   a) a rupture disk of conductive material comprising a pressure sensitive membrane portion and an outer circumferential surface;
   b) a first conductor secured to said pressure sensitive membrane portion; and
   c) a second conductor secured to said outer circumferential surface,
   wherein said first and second conductors are adapted to form a complete circuit through said disk.

2. The integral disk assembly according to claim 1, further comprising an insulating coating on surfaces of said disk.

3. The integral disk assembly according to claim 2, wherein said coating is Teflon ®.

4. The integral disk assembly according to claim 1, further comprising a metal casing about said outer circumferential surface.

5. The integral disk assembly according to claim 1, wherein said first and second conductors include wires.

6. The disk assembly according to claim 5, further comprising a housing disposed on said outer circumferential surface, a portion of said first and second wires being located in said housing, and means associated with the housing for connecting the wires to a signal system, said housing having a maximum dimension in the axial direction of the disk that is no greater than the axial dimension of said disk.

7. The disk assembly according to claim 6, wherein said connecting means comprises two wires for connection of said disk assembly wires to an alarm system.

8. The disk assembly according to claim 5, further comprising first and second gaskets disposed on a surface of said disk that is proximal to said membrane portion, a third gasket disposed on a surface that is distal to said membrane portion, and wherein said first conductor passes between said first and second gaskets.

9. The integral disk assembly according to claim 1, wherein said conductive material is graphite.

10. In a rupture disk assembly comprising a rupture disk of conductive material and means for sensing that the disk has burst, the improvement wherein the disk forms an electrical circuit between a first wire secured to a frangible membrane portion of said disk and a second wire connected to an outer circumferential surface of said disk, whereby the circuit is broken when said membrane portion bursts.

11. The disk assembly according to claim 10, further comprising an insulating coating on surfaces of said disk.

12. The disk assembly according to claim 10, further comprising a housing disposed on said outer circumferential surface, a portion of said first and second wires being located in said housing, and means associated with the housing for connecting the wires to a signal system, said housing having a maximum dimension in the axial direction of the disk that is no greater than the axial dimension of said disk.

13. An integral rupture disk sensor assembly comprising:
   a) a rupture disk of electrically conductive material;
   b) a first conductor secured to a pressure sensitive membrane portion of said disk;
   c) a second conductor secured to an outer circumferential surface of said disk;
   d) a first and second gasket for disposition on a surface of said disk that is proximal to said membrane portion;
   e) a third gasket for disposition on a surface of said disk opposite the surface having said first and second gaskets;
   f) a junction housing for said first and second conductors fixed to said outer circumferential surface;
   wherein said first conductor travels from said junction housing between said first and second gaskets to said pressure sensitive membrane portion, said first and second conductors forming a complete circuit through said burst disk when connected to an alarm system, whereby when said pressure sensitive portion bursts, said circuit is broken.

14. The disk assembly according to claim 13, wherein said junction housing has a maximum dimension in the axial direction of the disk that is no greater than the axial dimension of said disk.

15. The disk assembly according to claim 13, further comprising a insulating coating on surfaces of said disk.

16. An integral rupture disk assembly comprising:
   a) a rupture disk of electrically conductive material, said rupture disk comprising a cylinder having an annular support portion and pressure sensitive membrane portion, the annular support portion being thicker in the axial direction than the membrane portion, the membrane portion being flush and integral with an end surface of said annular support portion;
   b) a first wire having an end secured to an outer surface of the pressure sensitive membrane portion;
   c) a second wire having an end secured to an outer circumferential surface of the annular support portion;
   d) first and second gaskets for disposition on the end surface of said annular support portion that is proximal to said pressure sensitive membrane portion;
   e) a third gasket for disposition on an end surface of said annular support portion that is opposite the surface where said first and second gaskets are disposed;
   f) an insulating coating on surfaces of said disk;
   g) a junction housing secured to the outer circumferential surface of said disk, said housing having an axial thickness when mounted that is less than the axial thickness of said disk;
   wherein said first wire travels from said junction housing between said first and second gaskets to said pressure sensitive membrane portion where an end of said wire is secured to the surface of said membrane portion by electrically conductive cement, said first and second wires providing a means of forming a circuit through said disk, whereby when said pressure sensitive membrane portion bursts, the circuit is broken.

17. The disk assembly according to claim 16, wherein said first, second and third gaskets include a surface having a pressure sensitive adhesive thereon, whereby when disposed on their respective surfaces of said disk, the gaskets are held securely in place by said adhesive.

* * * * *